(12) United States Patent
Ford et al.

(10) Patent No.: US 6,272,457 B1
(45) Date of Patent: Aug. 7, 2001

(54) SPATIAL ASSET MANAGEMENT SYSTEM THAT TIME-TAGS AND COMBINES CAPTURED SPEECH DATA AND CAPTURED LOCATION DATA USING A PREDIFED REFERENCE GRAMMAR WITH A SEMANTIC RELATIONSHIP STRUCTURE

(75) Inventors: Terry Edward Ford; John Anthony Yotka; Richard James Turek, Jr., all of Aurora, CO (US)

(73) Assignee: Datria Systems, Inc., Englewood, CO (US)

( * ) Notice: Subject to any disclaimer, the term of this patent is extended or adjusted under 35 U.S.C. 154(b) by 0 days.

(21) Appl. No.: 08/714,583

(22) Filed: Sep. 16, 1996

(51) Int. Cl.[7] ............................. G06F 17/20; G06F 17/40; G06F 17/60; G01C 21/00
(52) U.S. Cl. .................................. 704/9; 704/1; 704/270; 704/276; 707/104; 455/456; 701/208; 701/213; 342/357.06; 342/357.09; 342/357.13
(58) Field of Search ............................. 704/9, 10, 1, 270, 704/276, 275; 707/100, 101, 104; 455/456; 701/207, 208, 213, 214, 215; 342/357.01, 357.06, 357.07, 357.08, 357.09, 357.1, 357.12, 357.13

(56) References Cited

U.S. PATENT DOCUMENTS

| | | | |
|---|---|---|---|
| 4,656,463 | 4/1987 | Anders et al. | 340/573.4 |
| 4,677,429 | 6/1987 | Glotzbach | 345/168 |
| 4,731,613 | 3/1988 | Endo et al. | 342/357.14 |
| 4,791,572 | 12/1988 | Green, III et al. | 704/267 |
| 4,814,711 | 3/1989 | Olsen et al. | 324/331 |
| 4,815,012 | 3/1989 | Feintuch | 340/995 |

(List continued on next page.)

OTHER PUBLICATIONS

Nu–Metrics, Inc.,"Nu–Metrics Instrumentation Roadstar 40A Distance Measuring Computer," 1987, pp. 1–2.
Nu–Metrics, Inc.,"Interfacing Trastar to the Novastar Highway Inventory System–NuMetrics Product Brochure," 1987, pp. 8–9.
GeoResearch, Inc.,"Digitize Directly on the Face of the Earth—GeoLink Product Brochure".
John D. Bossler,"GPS and GIS" Geo Info Systems, Mar. 1991 pp. 27–37.

(List continued on next page.)

*Primary Examiner*—Joseph Thomas
(74) *Attorney, Agent, or Firm*—Gibson, Dunn & Crutcher

(57) ABSTRACT

A data collection and automatic database population system which combines global positioning system (GPS), speech recognition software, radio frequency (RF) communications and geographic information system (GIS) to allow rapid capture of field data, asset tracking and automatic transfer of the data to a GIS database. A pre-defined grammar allows observations to be continuously captured, GPS location and time to be captured and stored on the field unit. Other sensor data is combined with the observations and combined with GPS and time information. A mobile unit's location is tracked real time or post processed through wireless RF transmission of location information between the mobile unit and a central processing station. Real time position correction is provided by Differential GPS (DGPS). The captured data is electronically transferred to a central processing station for operator performed quality assurance and automatic population of the GIS database. The system provides the algorithms to automatically correlate the data to linear and point observations in the GIS database. The system algorithms provide for automatic correlation of field data with all other GIS database layers. Tools to generate predefined or user defined reports, Work orders and general data queries allow exploitation of the GIS database.

30 Claims, 9 Drawing Sheets

U.S. PATENT DOCUMENTS

| | | | |
|---|---|---|---|
| 4,891,761 | | 1/1990 | Gray et al. .............................. 701/219 |
| 4,994,971 | | 2/1991 | Poelstra ................................... 701/35 |
| 5,170,164 | | 12/1992 | Lewis ..................................... 340/988 |
| 5,177,685 | * | 1/1993 | Davis et al. .......................... 455/456 |
| 5,193,185 | | 3/1993 | Lanter .................................... 707/101 |
| 5,214,757 | | 5/1993 | Mauney et al. ....................... 345/331 |
| 5,329,464 | | 7/1994 | Sumic et al. ............................. 703/1 |
| 5,381,338 | | 1/1995 | Wysocki et al. ...................... 701/207 |
| 5,384,893 | * | 1/1995 | Hutchins ............................... 704/267 |
| 5,414,462 | | 5/1995 | Veatch ................................... 348/135 |
| 5,418,906 | | 5/1995 | Berger et al. ......................... 345/326 |
| 5,426,780 | | 6/1995 | Gerull et al. .............................. 707/3 |
| 5,524,169 | * | 6/1996 | Cohen et al. .......................... 704/231 |
| 5,794,209 | * | 8/1998 | Agrawal et al. ........................ 705/10 |
| 5,968,109 | * | 10/1999 | Israni et al. ........................... 701/208 |
| 6,157,935 | * | 12/2000 | Tran et al. ............................. 707/503 |

OTHER PUBLICATIONS

Don Cromer,"Highway Maintenance Goes High Tech: The GIS/GPS Link," GPS World, Sep./Oct. 1990, pp. 42–44.

Peter Byman,"Mapping Finnish Roads with Differential GPS and Dead Reckoning," GPS World, Feb. 1991, pp. 38–42.

Tom Appleby,"Digital Road Mapping with GPS and GIS," GPS World, May 1991, pp. 33–37.

"3–D Real Time Scanning, GPS Digitizing Device Can Be Used With ARC/INFO," ARC News, Winter 1989, p. 33.

* cited by examiner

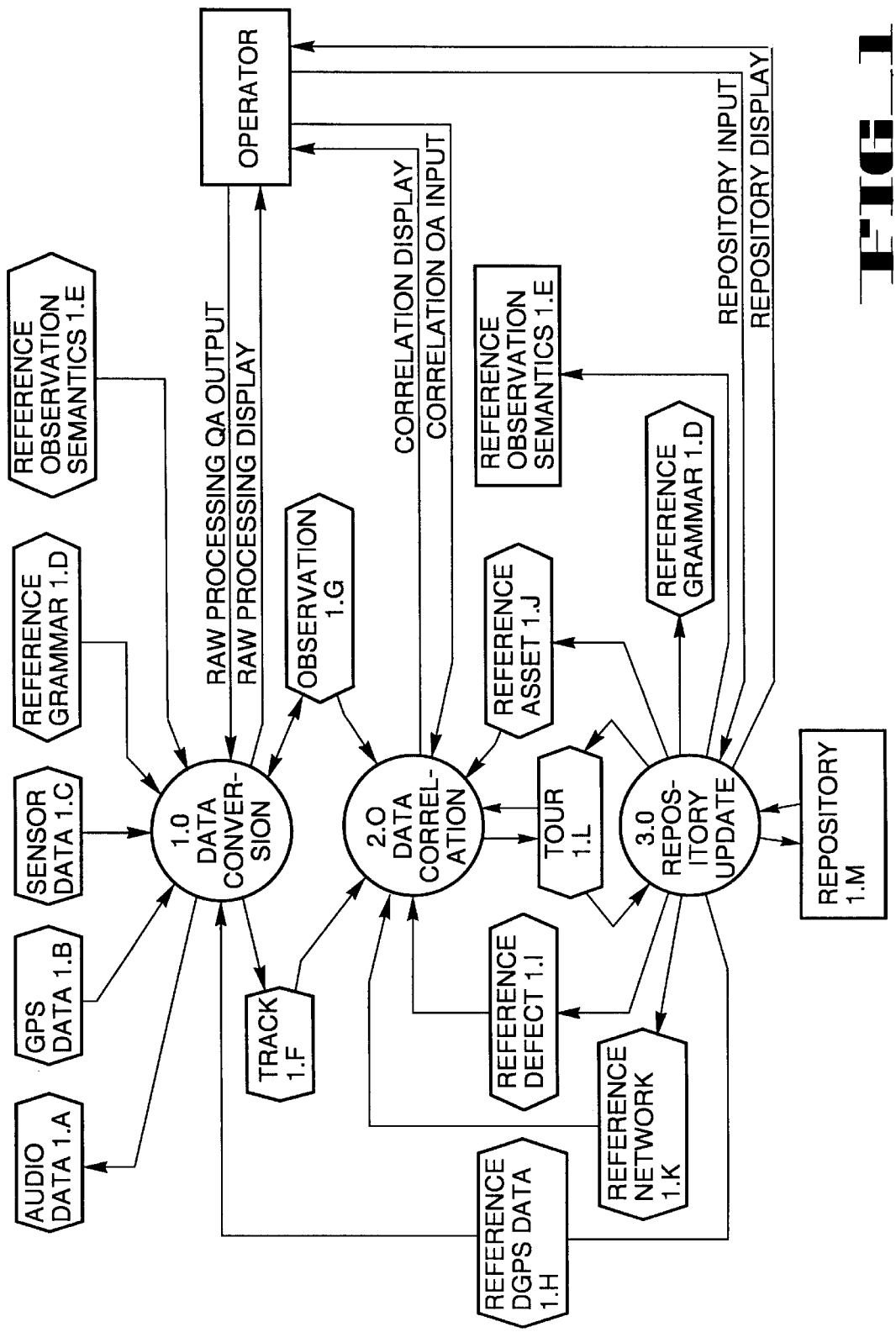
FIG_1

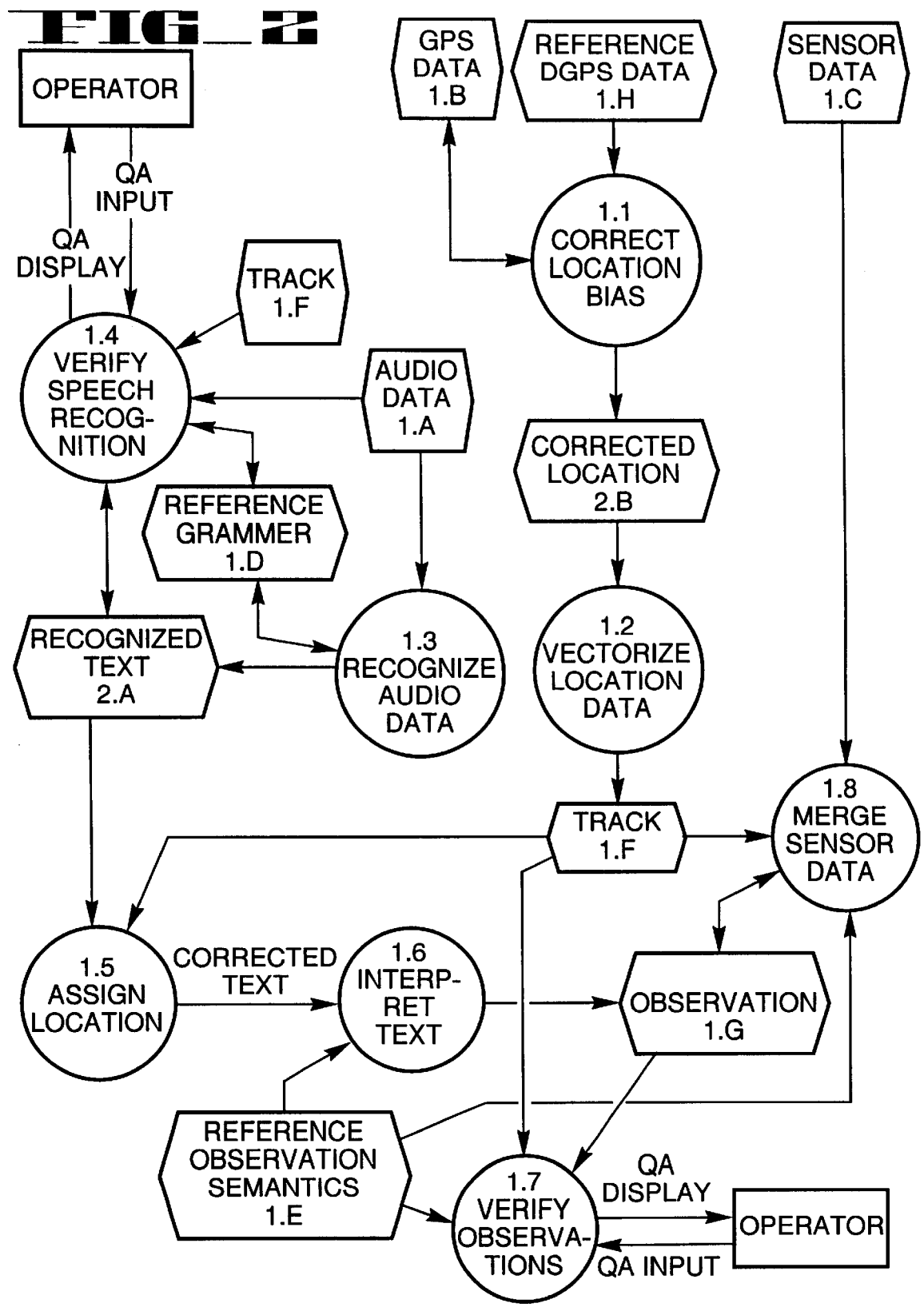

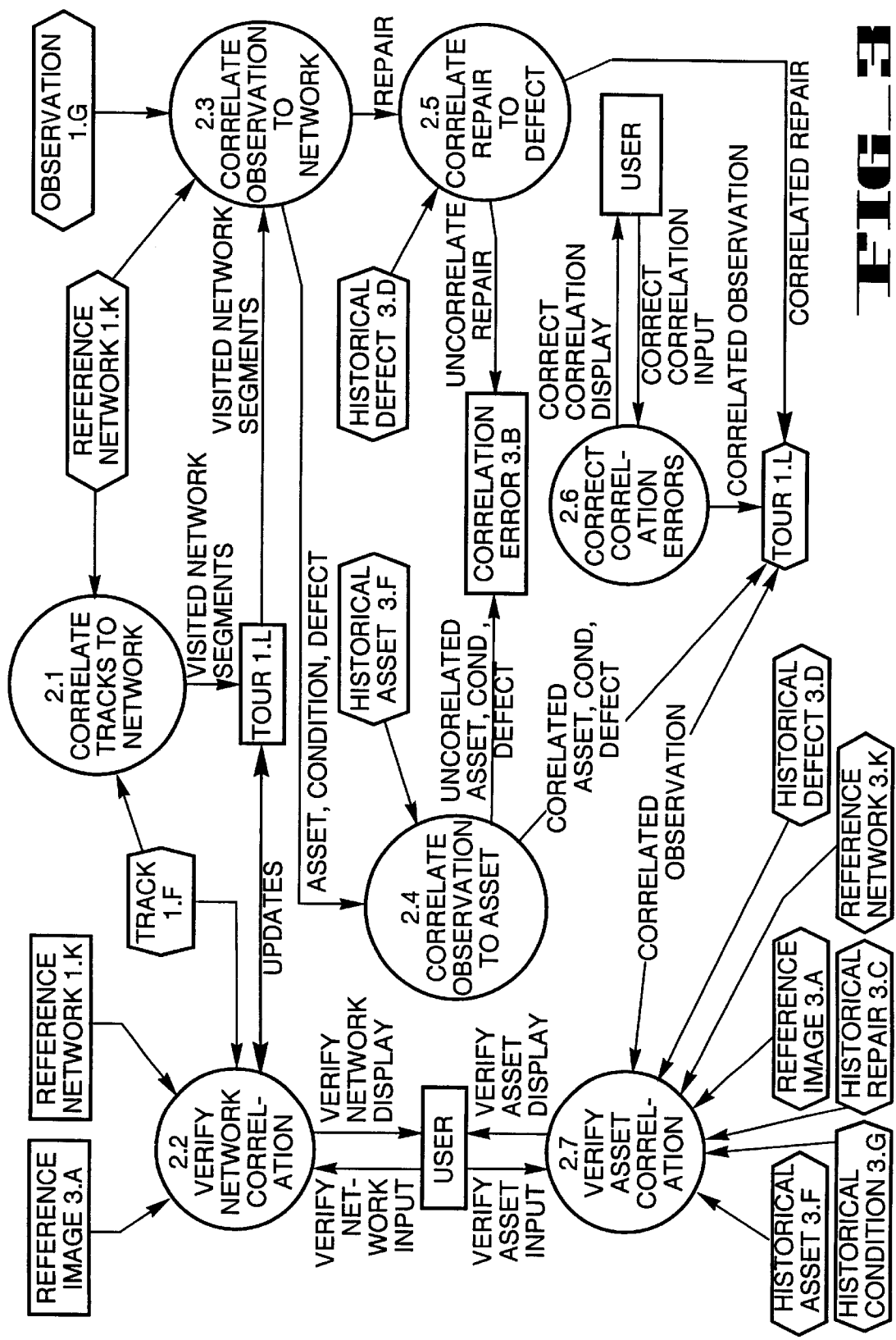
FIG_3

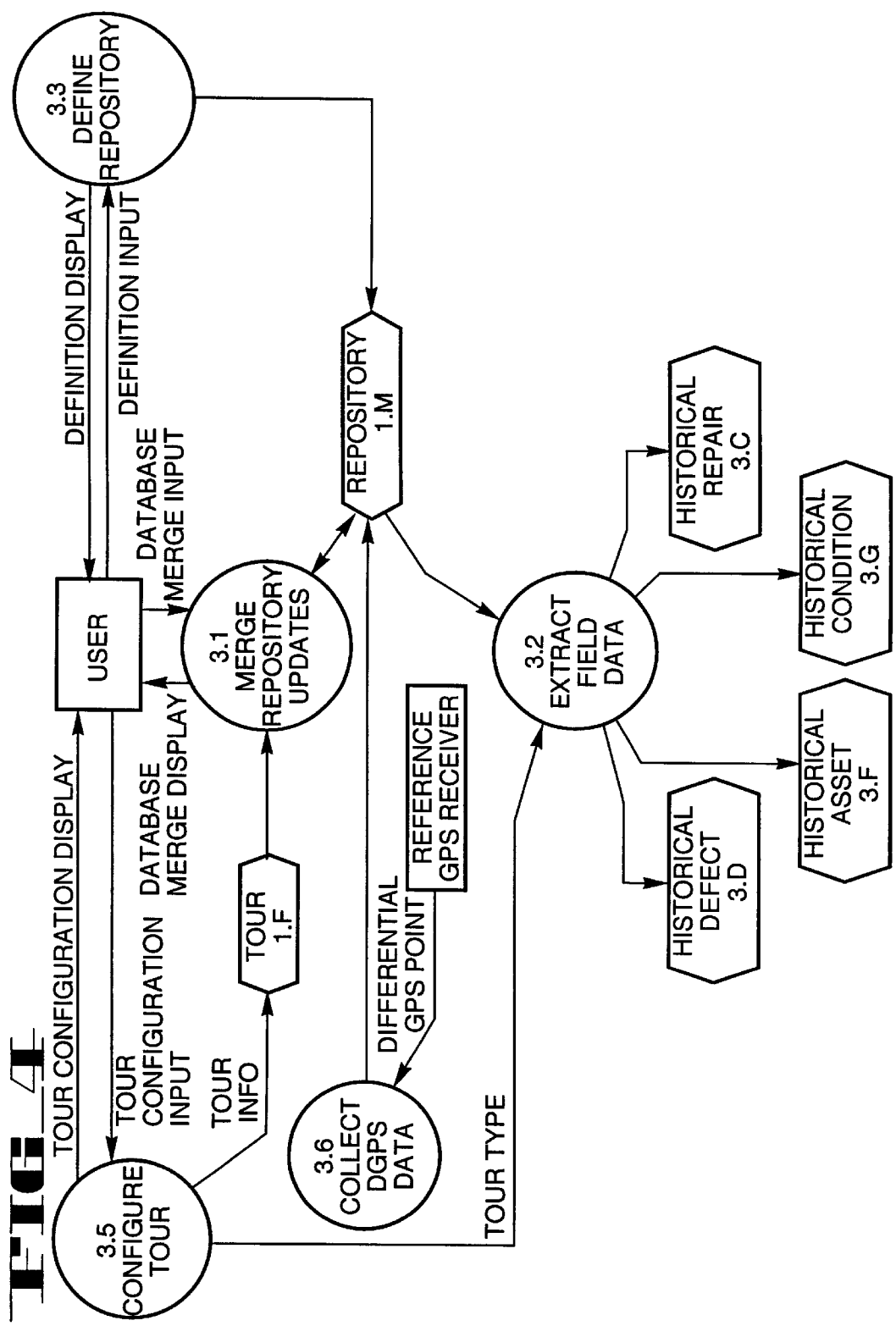

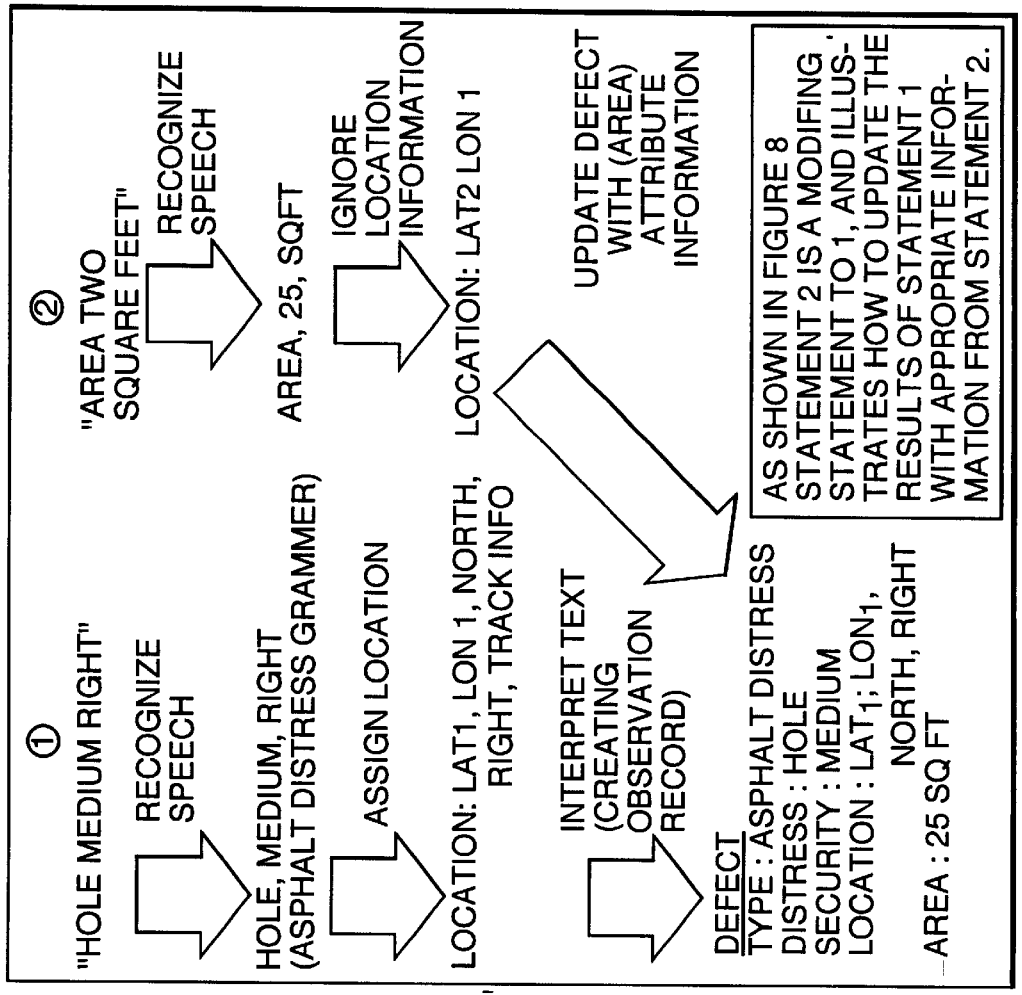
FIG_6
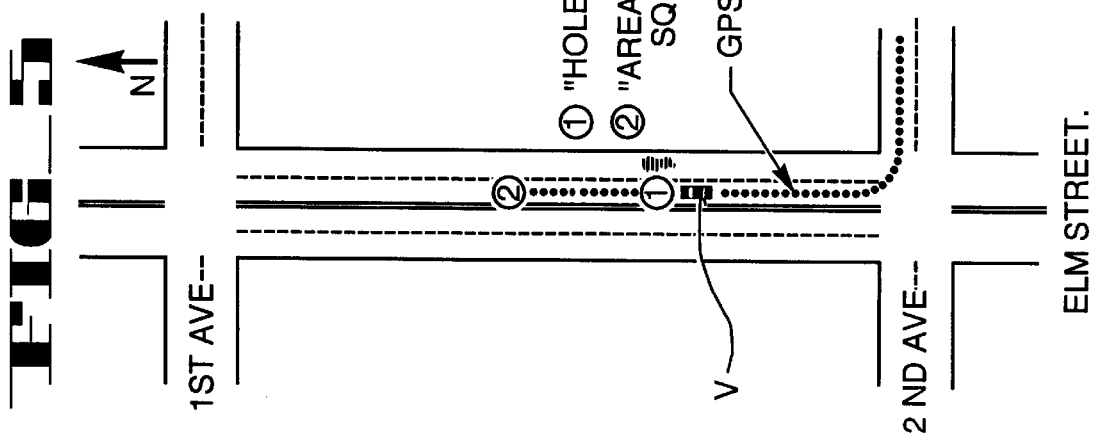
FIG_5

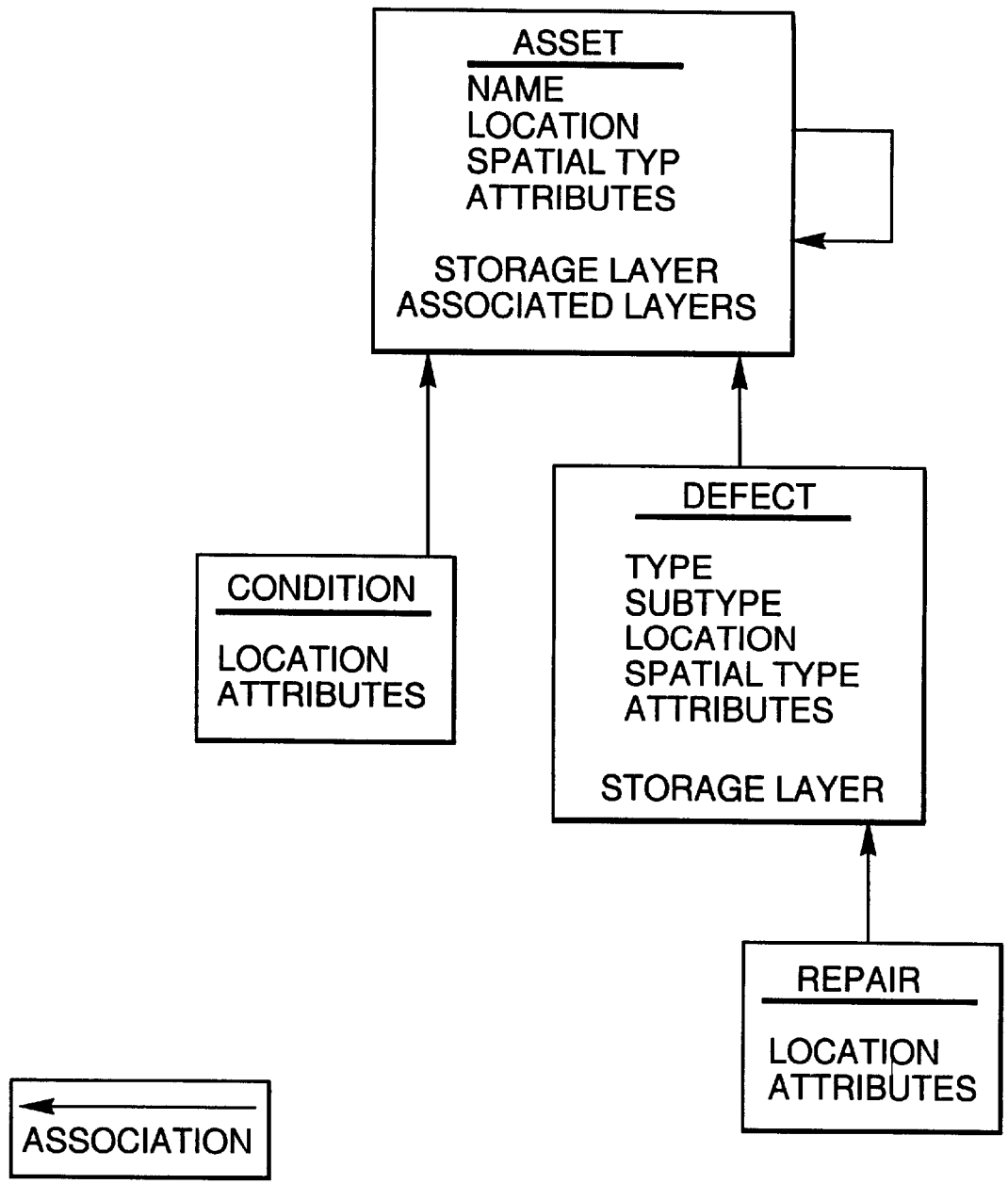

FIG. 8A

CONTEXT: asphaltproject ( ASPHALT PROJECT LEVEL GRAMMER )

OBSERVATION TEMPLATES : (OBSERVATIONS → GIS DATA)

shrparea      TAG : shrp      DESC : *This is an area shrp observation*

{%sSHRPAREA; %t; %p;distress%e; condition %e; streetpos %e; center; area % m
    : blob, sqft, 50;} blob      TAG :AREA      DESC : THIS IS A BLOB (CIRCLE) AREA OBSERVATION {%sBLOB; sqft%n;}

*TWO OBSERVATION TEMPLATE EXAMPLES SHOWN: "shrparea" and "blob"*

SENTENCE TEMPLATES: (SENTENCES MAKE UP OBSERVATIONS)

shrpdistressarea    TAG: shrparea    PrcType: new observation
(a SHRP distress object)

Slot: distressarea    Tag: distress    PrcType: copy
Slot: severity      Tag: condition    PrcType: copy
Slot: streetloc      Tag: streetpos    PrcType: copy

*TWO SENTENCE TEMPLATE EXAMPLES SHOWN: "shrpdistressarea" and "areasqft"*

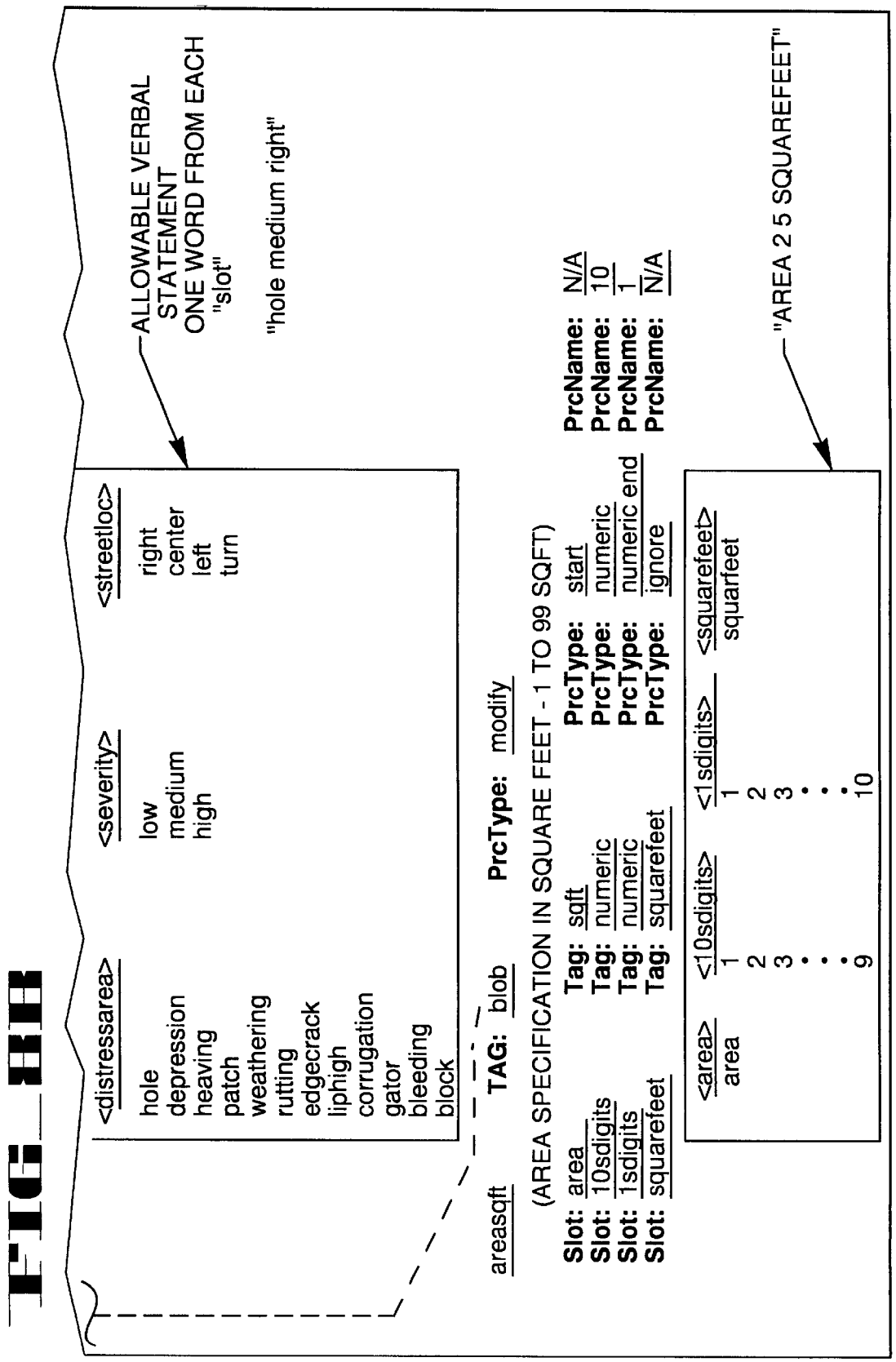

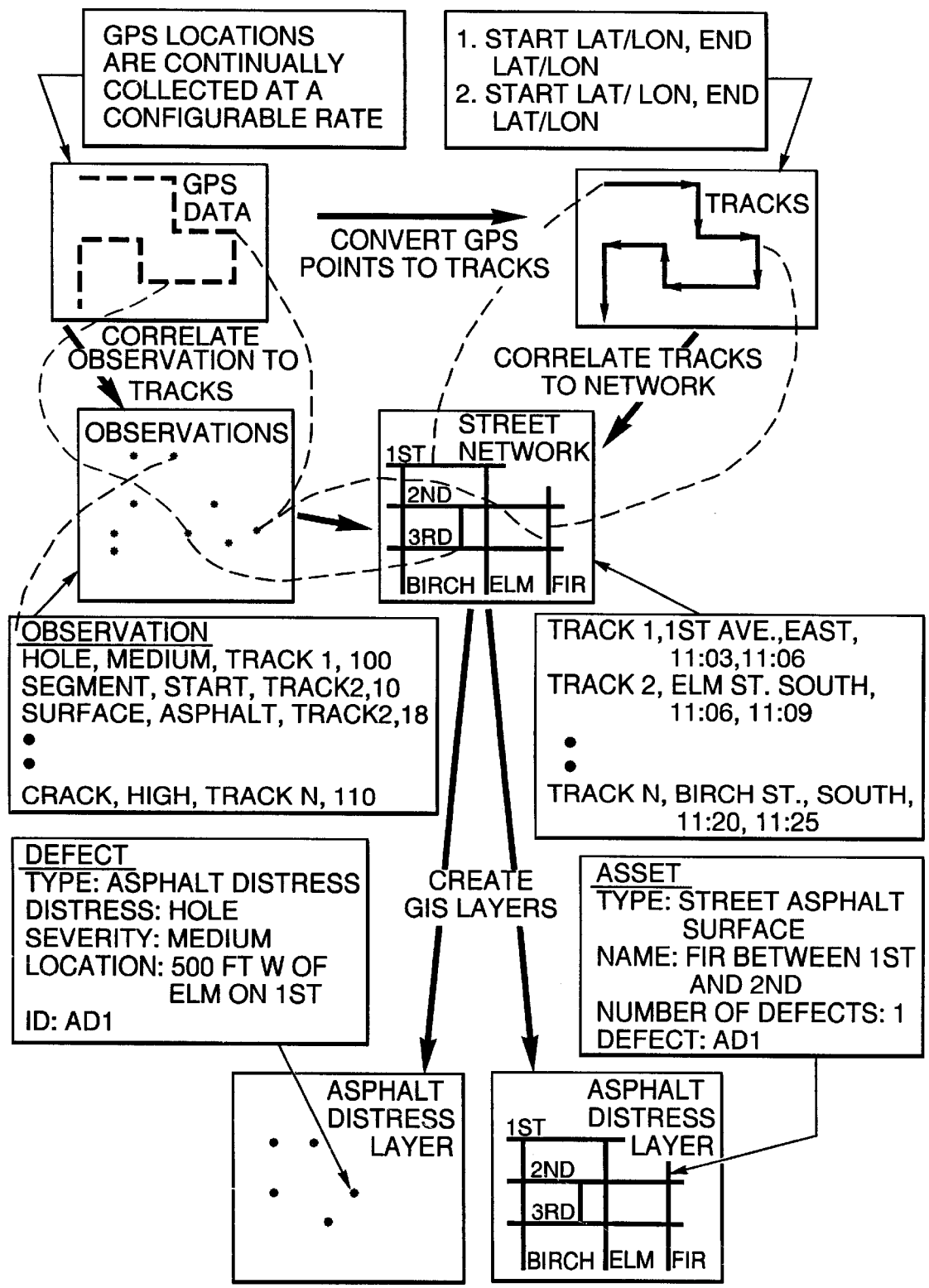

SPATIAL ASSET MANAGEMENT SYSTEM THAT TIME-TAGS AND COMBINES CAPTURED SPEECH DATA AND CAPTURED LOCATION DATA USING A PREDIFED REFERENCE GRAMMAR WITH A SEMANTIC RELATIONSHIP STRUCTURE

BACKGROUND OF THE INVENTION

The invention relates to methods for combining GPS, Speech Recognition, RF and GIS to perform mobile field data collection and automatic population of a GIS data base with fully attributed and correlated observation data.

The system relates particularly to a field data capture system and automatic GIS database population tool for a user to build GIS layers and fully exploit the data in the GIS.

Organizations responsible for the maintenance and inventory of assets are turning to GIS as the tool of choice to manage and display these assets. Over 80 percent of the cost of a GIS is capturing and placing accurate, fully attributed data into the GIS. These costs have prohibited many users from either implementing or fully exploiting the GIS.

A number of different methods have been developed for capturing data in the field. Many users use the data collection method of traveling an inspection route, visually identifying location and hand writing description onto a form or a paper entry. Once the inspector returns to the central data repository the entries are manually entered into a database with questionable accuracy and time consuming labor. The user must build the correlation and association logic into the database to create a useful tool. Back end applications must also be created so that the information be useful to the user. More sophisticated methods include GPS with push button data collection or pen computer data entry units which allow predefined buttons and menus to be used for field data collection. The data can be electronically down loaded into a database, but a user must still build the correlation and association logic. The information loaded is limited to point information with limited attribute information.

Audio based data entry systems have been developed but are limited to the recording of street point information sequenced with a manually recorded location input. The user is then required to manually convert, transfer and combine the location data to the audio data. There is no processing of the audio data and manual transcription and tagging of the entries with location data must be manually performed by the user. Only location data where a observation has been recorded is stored all other location information is ignored. Other speech recognition system require the user to prerecorded their speech to replace keyboard entries. None of the described systems provided the automatic population of the GIS with fully attributed and correlated data generated from speech recognition.

As users of spatial data incorporate GIS and GPS based technology, the need for a flexible, true end to end system that collects field data populates a GIS, tracks field assets, and provides tools to exploit the data will increase.

SUMMARY OF THE INVENTION

It is the primary object of the present invention to provide a method for a speech recognition based field data capture system, asset tracking and automatic GIS database population tool for a user to build GIS layers, to track assets, and to fully exploit the data in the GIS.

It is the specific object of the present invention to combine GPS, Speech Recognition, GIS and to provide field data collection, automatic GIS database population and exploitation of the GIS data.

It is a related object of the present invention to provide the real time tracking of assets in the field through the combination of GPS and RF communications.

In furtherance of this object, a field mobile unit capable of continuously capturing feature observations from predefined grammar and free speech as well as GPS based location information time stamped and automatically stored on the units onboard memory is created. Location information is automatically corrected in the field using DGPS and RF wireless data transmission. The location information is automatically combined with observation information to provide a continuous record of location and observations.

The preferred mobile field unit device is mounted in a vehicle or backpack. The audio headset microphone provides the means for initiating a speech based description of user observations. The mobile unit computer provides the onboard data storage of speech observations and the GPS time stamped location signal. The unit provides the ability to electronically transfer field data. The unit provides an audio feedback to the user to optimize speech entry start and stop as well as notify user of loss of GPS signal. The grammar structure provides self editing tools as well as a comprehensive description of field observations.

In the preferred form of the invention the location and observation information is electronically, at the central data repository or via RF wireless media, transferred to the central repository. The audio data process automatically converts the audio data collected in the field using the semantic information in the reference grammar and creates data records representing the information content of the user's verbal observations. The user can validate and correct observations statements. Interactive tools allow the user to review all speech entries and correct as required. The results are user validated and grammatically valid.

The preferred form of the invention automatically merges the corrected location data and the recognized text data and precisely synchronizes the verbal data to a location as well as identifying any continuous span of tracks covered by an observation. The data is then automatically entered into the GIS database and correlated to linear networks and point observations within the central data repository.

The preferred form of the invention provides predefined or customer configurable tools to exploit the data in the central repository. Work orders, custom reports and data query scripts are created using those tools.

The vehicle location information is derived from GPS which provides a time stamp from which absolute location coordinates may be determined through interpolation of recorded GPS data points.

Methods and apparatus which incorporate the features described above and which are effective to function as described above comprise specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles.

BRIEF DESCRIPTION OF THE DRAWING VIEWS

FIG. 1 is a diagrammatic view of a spatial asset management system constructed in accordance with one embodiment of the present invention. FIG. 1 shows the processes, the data elements used in the processing and the user interaction with the system. FIG. 1 is a high level overview of the system.

FIG. 2 is a diagrammatic view showing the details of the Data Conversion process of FIG. 1. FIG. 2 shows the Data Conversion processing in conjunction with the collected data elements and the reference data elements and the user interaction. FIG. 2 shows both the Audio Data and GPS data going through their appropriate processing paths and being merged into an Observation. FIG. 2 also shows, in the component labeled "Track", the historical representation of where the field operator had been and when the field operator had been there. The Observation and the Track are two key outputs of the Data Conversion process shown in FIG. 2. Semantic analysis is performed in the Interpret Text process and by use of Reference Observation Semantics to create the Observation.

FIG. 3 is a diagrammatic view showing details of the in the Data Correlation process of FIG. 1. FIG. 3 shows the two main data inputs (the Track and the Observation) coming from the Data Conversion process shown in FIG. 2. FIG. 3 shows that Track is first correlated to the Reference Network. FIG. 3 also shows that the input information Track and Observation are correlated to the Reference Network and to the appropriate other layers of the GIS creating a Tour object. The Tour object comprises: who collected the data; what data was collected; where the field operator was; what the field operator was doing; when the field operator was collecting the data; and the correlation results.

FIG. 4 is a diagrammatic view showing the Repository Update process as updated with the Tour results. FIG. 4 also shows, by the process entitled "Define Repository" and the process entitled "Configure Tour", the definition of the Repository structure.

FIG. 5 is a pictorial view, in plan, showing an example of data collection in the field. FIG. 5 shows a vehicle travelling north on Elm Street. FIG. 5 shows the position of the vehicle by its GPS points and shows two observation events indicated by the numerals 1 and 2. The data input from the observation events is voice data, indicated by the quotations in FIG. 5.

FIG. 6 shows the processing sequence for data conversion for the two specific observation events identified in FIG. 5. FIG. 6 also shows the semantic analysis of associating observation event 2 to observation event 1. The results of the semantic analyses are indicated by the inclined block arrow in the lower part of FIG. 6.

FIG. 7 is a diagrammatic view illustrating the four primary types of data maintained within the Repository of the system shown in FIG. 1. In FIG. 7 the arrows indicate the data structure relationships. As illustrated in FIG. 7, Assets can always be associated with other Assets, Condition must be associated with an Asset, Defect must be associated with an Asset, and Repair can be associated only with a Defect. FIG. 7 also shows the structure for each of the primary data types. The processing information portion of the structure of each primary observation type is embodied in the association (indicated by the arrows), the Spatial Type information, and the Storage Layer and Associated Layers information. Each of the primary observation types also has Location and Attributes in its structure.

FIG. 8 requires too much illustration area to be capable of being shown on one sheet of drawing and is therefore composed of FIG. 8A (on one sheet of drawings) and FIG. 8B (on the succeeding sheet of drawings). FIG. 8 is an example grammar of the type used in FIGS. 5 and 6 but for a specific asphalt distress observation type. Each of the boxes shown in FIG. 8 represents different sentence types. The two observation events illustrated in FIG. 5 correspond to the respective top box and bottom box in FIG. 8. The semantic information identifying that the second sentence is a modifier of the first sentence is illustrated by the two dashed lines in FIG. 8—the first dashed line going from "Tag:blob" up to the term "blob" and the second dashed line going from "Tag:area" up to "area" in the Observation Template. The observation statements in FIG. 5 correspond to the "Recognized Text" in FIG. 2, and the Reference Observation Semantics of FIG. 2 correspond to the information contained in the Asphalt Project grammar of FIG. 8.

FIG. 9 is an illustration of the Data Correlation process using the example illustrated in FIG. 5 and continuing the example shown in FIG. 6. FIG. 5 shows data collection. FIG. 6 shows Data Conversion. FIG. 9 shows Data Correlation. FIG. 9 shows how an Observation in Track data is correlated to an Asset—note the results of the correlation show that the Defect is correlated to the street segment on Elm Street between First Street and Second Street.

FIG. 9 also illustrates the process of moving data into the appropriate GIS layers in the spatial asset management system of the present invention.

DETAILED DESCRIPTION OF THE PREFERRED EMBODIMENTS

FIG. 1 presents an overview of a preferred form of the Spatial Asset Management System. Subsequent FIGS. 2–4 expand each major process shown in FIG. 1. For example, the process 1.0 DATA CONVERSION (the top circle in FIG. 1) is expanded into a more detailed flow chart in FIG. 2.

The Spatial Asset Management System described herein is a hardware independent system solution for managing assets with a strong geospatial component. The preferred form of the system is implemented in a commercial off-the-shelf laptop or pen-based computer for the "mobile system" component and a high performance PC for the processing workstation "home base" computer.

The three data stores Audio Data 1.A, GPS Data 1.B, and Sensor Data 1.C shown in FIG. 1 are generated in the mobile system laptop computer.

All subsequent processes and data stores are maintained in the "home base" computer or workstation.

The system provides for a seamless, fully automatic capture, translation, GIS import, and analysis/processing of asset information as represented by the Audio, GPS, and Sensor data stores developed during collection.

The mobile unit computer may be hand carried (e.g. backpack) or mounted on a moving vehicle (e.g. car, truck, bicycle).

FIG. 5 illustrates the collection of data whereby the user can drive, or walk along, an inspection route and can comment on observed defects, assets, asset condition or other observations. Also shown in FIG. 5 are the GPS points that are collected by the system.

FIG. 6 shows how the observations in FIG. 5 are processed functionally by the system to become data items that are correlated against existing asset information and analyzed for corrective action by operations personnel.

The mobile computer is configured with a commercial GPS receiver (or other location receiver device), a standard commercial sound board, and standard I/O device (e.g. printer, disk drive, RS-232 ports) along with a battery or external power source.

Other sensor inputs include such sensors as digital cameras, laser ranging devices, and others. Digital camera sensor input allows for photos to be included of city code violations for example. In this case the digital photo image is automatically tagged and tracked by the system so that photo evidence is included directly in the violation report sent to the offender.

Voice observations are automatically correlated with the sensor inputs to be incorporated as an associated data record.

The mobile computer captures and time tags all data store records. Each data store is independent and no other synchronized signal or input is required other than standard precision time.

The Audio Data 1.A store contains all speech audio data detected by the mobile system sound card.

The GPS/Location 1.B Data store includes location derived information containing latitude, longitude, and altitude of the mobile unit on a continuous basis once the unit is initialized.

The Sensor Data 1.C store contains any external sensor records (such as switch on/off states, analog values, digital photos, laser ranging data, other).

As will be described in more detail with reference to FIG. 2, the 1.0 Data Conversion process means receive the mobile unit data Audio, GPS/location, Sensor stores described above. The Data Conversion process operates on these inputs in conjunction with reference data (1.D, 1.E, 1.H) to produce Track 1.F objects and Observation 1.G objects data stores. The functions supported by the Data Conversion process are: 1) automatic interpretation of audio data spoken words using a reference dictionary contained within the Reference Grammar data stores, (1.D), 2) automatic detection of word level interpretation error conditions, 3) automatic interpretation of phrases using pre-defined meaning and phrase syntax contained within the Reference Observation Semantics 1.E data stores, 4) automatic detection of semantic error conditions, 5) optional correction of GPS location data using Reference DGPS Data 1.H, 6) automatic generation of time based location Track 1.F data objects in internal system format, 7) automatic generation of time based Observation 1.G data objects and internal system format and 8) Operator uses interactive displays to perform Quality Assurance (QA) functions against either Audio or Sensor data stores.

The net result of the 1.0 Data Conversion process is a data store of error corrected track information which is an automated time sequenced track of the mobile unit's historical travel path with precise latitude, longitude and altitude for a given "tour." (Note: Tours are actually generated by the 2.0 Data Correlation process)

Another result of 1.0 Data Conversion process is a time sequenced, operator quality assurance checked, set of observation objects which represent either discrete observations (e.g. "tree, foliage damage," "stop sign, class 1 damage," "pothole, high, right"), linear observations (e.g. "start curb and gutter run," "end curb and gutter run," "start road width 32," "end road"), or polygon definitions which is a unique form of track data store.

These Track 1.F and Observation 1.G data stores are available to the 2.0 Data Correlation process.

FIG. 6 illustrates the buildup of these data types.

The system organizes data into a logical contiguous set of collected data that may last from a few minutes to several hours, A streets inspection tour, for example, would typically consist of the collection of street distress data for several hours before concluding the collection and submitting the collected data to the home base workstation for processing.

The "discrete" observations captured includes any and all assets which are best categorized as a item or set of items at discrete locations. Examples of types of objects collected are signage, lights, street distresses, concrete distresses, park benches, tree damage, utility cuts, utility access covers, fire plugs, incidences of code violations (e.g. weeds, illegal cars parked, damaged fence), curb damage, sidewalk distresses and other items. Usually discrete object observations are accompanied by a status, state, or condition which related to the object and position, a size or other descriptive term that may help identify or qualify the observation. The phrase "pothole, medium, right," would be translated by the 1.0 Data Conversion process to mean:

"pothole"=pothole type of road distress
"medium"=distress severity medium
"right"=the right lane (assuming more than one lane in current direction of travel).

Similarly "linear" observations are used for assets or objects that are running or continuous in nature for some significant length. Examples are roads, sidewalks, curbs, gutters, fences, paint stripping, property frontage, and others. Linear objects are usually accompanied by state or condition plus an indication that the running asset starts or stops at some position.

An example might be when an inspector is monitoring the condition of road centerline paint conditions. A phrase may be "start road centerline paint condition 3" which would mean that the inspector is reporting the beginning of a class 3 (badly worn) status of road stripping condition. This condition may last for several miles for example. When the condition changes the inspection would terminate the running asset condition with a phrase such as "end road centerline condition 3."

The system interprets and keeps track of all running asset states. In addition the inspector may continue commenting on any other objects or observations while the stripping condition are being tracked. That is to say that the inspection can start a running asset observation (like the road paint stripping), then report on several defects (such as sign damage), and then terminate the running asset conditions.

The system automatically keeps track of all such interleaved conditions.

Logic errors are automatically detected and identified to the operator during the Quality Assurance processing with the 1.0 Data Conversion process.

Another observation data type is "polygonal." Polygonal data is usually associated with defining areas or boundaries.

Using a backpack mounted system, a parks inspector might, for example, walk and define the boundaries of an area of park, or perform a tree or endangered species inventory or forest damaged by some infestation.

The results would be a polygon that describes the area where the observations are located.

As described in more detail below the 2.0 Data Correlation process means operates on the Track 1.F and Observations 1.G data stores which are output by the 1.0 Data Conversion process means to perform correlation against a variety of reference data.

The 2.0 Data Correlation process organizes and associates Track 1.F data with Observations 1.G data stores which are output to produce logical "tours" which are sets of data (collected by the user) such as those discussed earlier.

The 1.0 The Data Correlation process automatically routes data items to the proper layer of the Geographic Information System (GIS) data base for further processing.

That is to say, signage would be associated with a specific layer of GIS whereas street distresses would be associated with a separate layer for example.

The 1.0 Data Correlation process uses the Reference Asset 1.J data store to correlate the collected discrete asset observation tour data to the existing data base of objects (e.g. signs, park benches, etc.) of the same category or class.

The system automatically detects inconsistencies between the collected and reference asset data and brings problems to the attention of the field operator.

These inconsistencies can be corrected or edited using Quality Assurance tools provided.

Ultimately the Reference Asset data base is updated for future reference.

Similarly observation tour data which represents discrete defects, (e.g. road potholes, fence damage, curb upheaval) are correlated and compared against the Reference Defect 1.1 data store and are Quality Assured for consistency and logical error state by the Data Correlation Process.

The 2.0 Data Correlation process also performs the same type of functions for linear observations tour data such as curbing and sidewalk networks using the Reference Network 1.K data store.

A set of Edit and Quality Assurance tools are provided to support the correlation processing of network type data.

Reference Network 1.K data stores include simple tour location track data as well (which allows the system to capture and compare location track data independent of collected discrete, or linear objects). This enables the system to identify which inspectors have inspected which streets and when. It also allows a broad range of tour analysis functions to be accomplished, such as, which areas streets have not been inspected for the last three months, for example.

The general functionality supported by the 2.0 Data Correlation process are 1) automatic association of collected data to proper GIS layers, 2) automatic detection of inconsistencies between collected observations and reference data, 3) correction of conflicted data, 4) analysis of tour location track information such as routes traveled with temporal reference, 5) quality assurance of correlated data, and 6) the organization and association of Track 1.F and Observation 1.G into "tours" which are correlated location, observation, and time data sets.

The 3.0 Repository Update process means provide all of the tools to create, update, and generally manage the system reference data bases. A primary input to this process is the Tour 1.L data store which is generated by the 2.0 Data Correlation process.

The 3.0 Repository Update process provides the tools to create new assets and/or conditions the system will recognize by updating the Reference Grammar 1.D data store and the Reference Observation Semantics 1.E data store along with the appropriate Reference Asset 1.J, Reference Defect 1.I, or Reference Network 1.K data stores. Using this function allows the user to add new types of defects (such as a new type of the damage or new class of utility cut in the road), add new asset types, add new tour type (such as utility inspection tours) and any other operational data elements needed.

Data management tools include editing, data consistency checking, data integrity and version control, and backup tools.

Operational data store elements are maintained in the Repository 1.M data base. The Repository data store is where the results of system processing are placed.

Using a variety of GIS configured, third party, and Spatial Asset System tools the field operator/user can gain access to the operational data base for analysis and reporting purposes. The analysis and reporting tools include both ad-hoc and predefined analysis and reporting capabilities. They range from such capabilities as visual analysis and interrogation of GIS layers to specific reports on such elements as road defect history in a given neighborhood.

The user can query and generate reports on any and all data contained within the Repository data stores. Using these tools the user can ask such questions as:

How many of a specific asset type is located within center boundaries?

What are the specific work orders (time to accomplish, etc.) to repair specified road segments?

Show the inspection routes covered by a specified inspector over a given period of time.

Show all road signs that are severely damaged and what is an optimal route for repair.

FIG. 2 is a detailed diagrammatic view of the 1.0 Data Conversion process of FIG. 1.

From the field collection process the results of the operator's verbal inputs are represented by the data store labeled Audio Data 1.A. These are time stamped digital audio data segments corresponding to each verbal phrase spoken by the field operator.

The data store identified by the label, GPS Data 1.B, represents all of the GPS data collected in the field during the operator's trip.

The Reference DGPS Data store 1.H is the DGPS correction data collected during the operator's trip.

The process 1.1 Correct Location Bias applies the correction data to the GPS data, if it was not corrected in the field using real-time DGPS.

Note that in the preferred implementation the field GPS units can be used in either real-time DGPS mode or post-processing DGPS mode, depending upon the needs of the field operator.

The results of the 1.1 Correct Location Bias process is DGPS corrected location data that is then stored into the 2.B Corrected Location data store. The corrected data is then processed, by 1.2 Vectorize Location Data to convert the individual point data, typically collected at 1 second intervals, but any interval period is possible, into track data which is stored in Track 1.F. The purpose of this processing is to compress the point data into a higher order representation of linear and arc based tracks. This compression greatly improves the performance of latter processing illustrated in FIG. 3.

The 1.3 Recognize Audio Data process automatically converts the Audio Data 1.A collected in the field using the semantic information in Reference Grammar 1.D and creates intermediate data records (Recognized Text 2.A) representing textually/linguistically the information content of the operator's verbal statements made in the field.

Note the field unit can record the audio data in either of two ways; first it can recognize when voice is present and only record when the operator is speaking, this is the preferred approach, or it can record all data regardless of whether the operator is speaking.

In the latter case, the 1.3 Recognized Audio Data process will break the continuous audio data into the individual spoken phrases using the same approach as the field unit would use, i.e., energy threshold of the audio data.

The User then can validate and correct any problems with the results through the 1.4 Verify Speech Recognition process.

With the interactive tools provided in this process the user can review all of the automatic recognition processing and fix any problems encountered.

The Reference Grammar 1.D information is used to maintain the integrity of the resulting fixes.

The Track 1.F information is used to provide visual location information to the operator on where they were at the time they made the verbal statement.

The results from 1.4 Verify Speech Recognition processing are stored into Recognized Text 2.A. These results are both user validated and grammatically valid.

The 1.5 Assign Location process automatically merges the Track 1.F data and the Recognized Text 2.A data, precisely synchronizing the verbal data to the location data and identifying any contiguous span of tracks covered by an observation.

The resulting merged data is forwarded to the 1.6 Interpret Text process. This process uses the Reference Observation Semantic 1.E Information to merge the sequence of recognized text into actual Observations 1.G.

It should be noted that the system can take a non-contiguous set of verbal statements and combine them into a single observation. An example of this process is discussed latter, relative to FIG. 8.

The 1.6 Interpret Text process performs the semantic analysis on the sequence of recognized text to determine if it is complete and consistent.

The results of this processing are Observations 1.G including tagged errors.

The operator interacts through the 1.7 Verify Observations process to review and fix the errors identified in 1.6 Interpret Text.

The 1.8 Merge Sensor Data process converts the information collected in the field from any of a number of sensors. The only requirements are that the sensors can be interfaces by either serial or parallel port. Examples are: Laser Range finders, digital cameras (serial port) and on/off switches (parallel port).

The data store holds the Sensor Data 1.C along with the time information.

The 1.8 Merge Sensor Data process uses the time and the Reference Observation Semantics 1.E to merge in the sensor data into the appropriate Observation 1.G. For example, if a laser range finder is the sensor, then the updated sensor data could be a delta location from the user to the observed object in the field; or if the sensor is a digital camera, then the updated sensor data is the digital image, which is associated to the verbal observation.

The 2.0 Data Correlation process (FIG. 3) is the mapping of Observations 1.G and Tracks 1.F to the underlying network and assets.

Correlation consists of two phases.

The first phase is network correlation.

In network correlation, each track of the vectored track data is correlated to one or more network segments (1.K). This network correlation shows the history of where and when the inspector traveled. This allows the system to collect the regions of when and where the network was inspected and the regions where the network was not inspected.

Additionally, all observations are also correlated to the underlying network by comparing the time of the observation to the start and end times of each track. At the end of this phase, the operator is allowed to verify both the network correlation and the voice captured observations.

The second phase is asset correlation which consists of correlating observations to assets. In this phase, the observations are associated with a specific asset or object.

Observations fall into two categories, discrete and linear observations.

Discrete observations are typically point observations or conditions which translate into either a point or a small area or line. Examples of discrete observations are a stop sign, utility pole and pot hole.

Linear observations are typically running objects or conditions in which pairs of statements are used to describe the network between the two points. Examples of a linear observation are street, gas pipeline, long crack on a road.

During asset correlation these observations are translated into either assets or distresses depending on the observation made.

Running or linear observations are mapped to each of the network or asset segments that fall within the tracks driven by the inspector.

At the end of this phase the operator is allowed to verify the observation to asset mapping via display of historical data captured in the area, as well as the current observations.

Anomalies in the data are automatically detected and shown to the operator for correction.

Tracks are correlated to the underlying reference network in 2.1 Correlate Tracks to Network process by initially performing a spatial query of the segments nearest the starting track. The orientation of the segments are compared against the track; and the segment that matches the track, within a tolerance, is taken to be the starting segment. The next segment is determined by comparing the orientation of the segments that enter and leave the segment at each of its two nodes to the next tracks. This operation continues until all tracks have been correlated to segments. The output of this process is a map of visited network segments that becomes part of the inspection Tour 1.L data.

After the tracks are correlated to the network, the user is allowed to verify the network correlation through the 2.2 Verify Network Correlation process. Here, the reference network and any Reference Imagery 3.A is displayed to the user, along with the visited network segments from the tour and the raw track data. The user is able to verify that the tracks were correlated to the correct segments, and correct those mapped incorrectly. If a track was not mapped, the user can use the reference imagery and reference network 1.K to determine if the track should have been mapped to an existing network segment. In addition, the user can determine if a new network segment should be added to the reference network.

After the tracks are correlated, the observations are then correlated in the 2.3 Correlate Observation to Network process, using the visited network segment table that mapped tracks to network segments. The observation was previously mapped to a track during the 1.0 Data Conversion process (see FIG. 2), and this included determining the distance along a track where the observation occurred.

The correct segment for an observation is then determined spatially from the list of network segments that mapped to the track and the distance along the track for the observation.

Observations are correlated to assets (both Historical Assets 3.F and new assets) in 2.4 Correlate Observation to Asset process by using the observation to network mapping that was previously performed in process 2.3. Assets and or defects that are created from observations can be compared to historical assets and defects by determining the common network segments and then performing spatial analysis on the new item to the historical items.

Observations are correlated to assets for one of two purposes.

The first is to determine if a new asset conflicts with existing historical assets. If conflicts are detected, they are displayed one at a time to the user for correction.

The second purpose for observation correlation is to determine for which asset a defect has been noted.

The defect to asset mapping can be used by an analyst to determine the amount of work that can be completed over a period of time for an area.

Repairs are correlated to defects in the 2.5 Correlate Repair to Defect process to update the status of historical defects. The user is able to build a work order from all observations. The user has an interactive graphical display to select defects to be worked.

Tools are provided to filter defects by severity level, date, type and other parameters to further define the data set to be worked. The user can then generate standard or user defined reports to respond to the defects.

Once work orders are marked as complete, the database is automatically updated to reflect completion.

If an observation is not correlated to a network segment, the user can use graphical tools in the 2.6 Correct Correlation Errors process to correct an observation so it is mapped to the correct network segment or asset. If an observation cannot be corrected at this time, it may be suspended for later correction. This allows the user to save the data for re-input at a later date, when one of the following has occurred: 1) the user has additional information about the observation to allow him to correct it, or 2) assets that may have been missing have been collected, or 3) a system error has been corrected.

The 2.7 Verify Asset Correlation process is performed prior to the Tour 1.L data being uploaded to the master database. During this phase defects, conditions and assets collected from the current inspection tour are displayed to the user, along with the historical defects, conditions and assets from the same geographic area. The reference network 3.K and reference imagery 3.A covering this area may also be displayed at this time to assist in determining the validity of the tour data set. The system then detects conflicts between the current assets and historical assets 3.F. The user is walked through the conflicts one at a time and is allowed to repair them using graphical tools.

FIG. 4 is the diagrammatic view of the repository maintenance functions. The user interacts with the system through these functions to define the data to be collected and merge the collected data into a central repository. The user interacts with three functions to perform repository maintenance.

The user, through a series of displays in 3.3 Define Repository process, defines the data to be collected and the grammars with semantics used to process the collected field data.

The user, through a display in the 3.5 Configure Tour process, identifies what types of data is collected during his field data collection session. By identifying the types of data collected, the system applies the appropriate grammars and semantics to translate the data collected in the field into data base records. The user also enters his name, organization and other relevant information.

The user, through a series of displays in the 3.1 Merge Repository Updates process, merges the data collected in the field into the central Repository 1.M. The assets, conditions, defects, and repairs are compared to the appropriate layer of historical data. Any discrepancies in the data are flagged and presented to the user for resolution. A discrepancy is identified when the new data is not consistent with the data already resident in the repository. After discrepancies in the data are resolved, the user approves the changes and the repository is updated.

The 3.6 Collect DGPS Data function continuously collects GPS reference data from an attached GPS receiver and stores it in the central repository. This data is used to correct errors in the field collected GPS data. This correction can be performed post processed or in real time.

The Repository 1.M data contains all the data for the system including all data stores discussed in earlier figures. This is data collected in the field, historical data, and data used but not changed by the system, and reference data. The repository contains, as a minimum, the following historical data: Assets, Conditions, Defects, and Repairs. The repository contains, as a minimum, the following reference data: DGPS Data, Grammars, Semantics, and Imagery.

The Tour 1.F data store contains the information collected in the field and statistics about the field session. The information contained in the tour is at a minimum: the inspector, data, duration, type of inspection, and correctly formatted repository updates.

The 3.2 Extract Field Data process provides the function of combining tour data with other historical data stores for processing and use by the user.

FIG. 5 shows an example of data collection in the field. FIG. 5 shows a vehicle V travelling north on Elm street. FIG. 5 shows the position of the vehicle V by its GPS points and shows two observation events indicated by the numerals 1 and 2. The data input from the observation events is voice data, indicated by the quotations in FIG. 5.

FIG. 6 shows the processing sequence for data conversion for the two specific observation events 1 and 2 identified in FIG. 5. FIG. 6 also shows the semantic analysis of associating observation event 2 to observation event 1. The results of the semantic analyses are indicated by the inclined block arrow in the lower part of FIG. 6.

FIG. 7 is the diagrammatic view of the four primary observations types. These four observations represent the possible data collected in the field and maintained in the Repository and are described in more detail immediately below.

Asset

Assets represent objects in the field that the user wishes to track and maintain. Examples of assets are: street signs, side walks, and curbs. Assets can be related to other assets. For example, a street sign that has one post and two signs attached can be represented as three assets that are associated together. Both Assets and Defects (below) have a spatial type (e.g., point, linear or polygonal). The spatial type and the associated layers information define how the asset information is correlated to other GIS layers during the automatic correlation processing shown in FIG. 3. For example, street sign assets may be associated to a side GIS layer. This association defines that the location of the sign asset should be altered during processing to snap (or adjust) its position to be on the street edge, not in the street. Similarly, for defects, a concrete defect, such as a crack, will be associated to the concrete network asset layer, which in turn is associated with the street edge layer.

Condition

Condition represent attributes of and asset that change over time and or position. The condition of the assets may be established in the system through grammar tables to allow the user to collect a predefined range and classes of conditions. The conditions for street sign could be good, fair, poor.

Defect

Defects represent a defined flaw in the asset that affects the health or goodness of the asset. These defects can be set again through grammars to reflect a type of defect or a severity.

Repair

Repairs are the removal of defects. As a repair is made the central repository can be updated to reflect the repair and the defect is then automatically removed from the database.

The diagrammatic view of FIG. 7 illustrates the four primary types of data maintained within the Repository of the system shown in FIG. 1 and also the possible relationships of the types of data. In FIG. 7 (as illustrated by the diagram box in the bottom left hand corner of FIG. 7) the arrows indicate the possible associations of the data structure relationships. Thus, as illustrated in FIG. 7, Assets can always be associated with other Assets, Condition must be associated with an Asset, Defect must be associated with an Asset, and Repair can be associated only with a Defect. FIG. 7 also shows the structure for each of the primary data types. The processing information portion of the structure of each primary observation type is embodied in the association (indicated by the arrows), the Spatial Type information, and the Storage Layer and Associated Layers information. Each of the primary observation types also has Location and Attributes in its structure.

As noted above in the Brief Description of the Drawing Views, FIG. 8 required too much illustration area to be capable of being shown on one sheet of drawings and was therefore composed of FIG. 8A (on one sheet of drawings) and FIG. 8B (on the succeeding sheet of drawings). Since it was necessary to show FIG. 8 on two sheets, the textual content of FIG. 8 is also set out below in this text for convenience in reference.

FIG. 8 is an example grammar of the type used in FIGS. 5 and 6 but for a specific asphalt distress observation type. Each of the boxes shown in FIG. 8 represents different sentence types. The two observation events illustrated in FIG. 5 correspond to the respective top box and bottom box in FIG. 8. The semantic information identifying that the second sentence is a modifier of the first sentence is illustrated by the two dash lined in FIG. 8—the first dashed line going from "Tag:blob" up to the term "blob" and the second dashed line going from "Tag:area" up to "area" in the Observation Template. The observation statements in FIG. 5 correspond to the "Recognized Text" in FIG. 2, and the Reference Observation Semantics of FIG. 2 correspond to the information contained in the Asphalt project grammar of FIG. 8.

As noted above, FIG. 8 is an example grammar to the type used in FIGS. 5 and 6 but for a specific asphalt distress observation type. This example grammar illustrates one possible implementation of our method. There are two main sections illustrated in the Figure; the Observation Templates and the Sentence templates. Each of the spoken sentences and the resulting observation templates are shown for the examples used in FIGS. 5 and 6.

In the first observation template, shrparea, the structure of the resulting observation is defined by the specification enclosed by the "{ }". The "%s" identifies the type of GIS record to create; "%t" identifies that time is to be included; "%p" identifies that location is to be included; "%e" identify the several different slot values that are to be included; note the ":center" following the streetpos specification indicates that the value of center is a default; and the "%m" identifies that there is a future modifying statement to include, if not found then "blob,sqft,50" is the default.

The semantic relationship between the two separate verbal sentences is further illustrated by the dashed lines that indicate associations between templates; and between sentences and templates.

The FIG. 8 further illustrates the semantic structure of the sentence templates. Each sentence, which corresponds to a set of possible verbal statements, is composed of slots. The information of how slot values are transferred to the observation record is defined by the PrcType attribute of each slot.

For the first sentence "shrpdistressarea" each of the slots are copied into the resulting observation record based on slot tag.

For the "areasqft" sentence the numeric values are combined to for a true number and that is, by convention, assigned to the "area" slot, with tag "sqft" and that is then copied into the "sqft%n" specification of the "blob" observation template. In this case the "%n" implies a numeric value required.

The result of using this semantic information enables the two distinct verbal observations made in the examples of FIGS. 5 and 6 to be combined automatically into one resulting GIS record.

FIG. 9 illustrates graphically the data correlation process for the examples illustrated in FIGS. 5,6 and 8.

While data collection is in progress, GPS data points are continuously collected, as well as the audio data and the other sensor data (see FIG. 2). The GPS data record contains the location as well as the time stamp for that location.

When the system detects voice input by the user, a raw observation is created. This raw observation consists of the recorded voice and a time stamp.

Time is used as the synchronization key between all of the independent data streams, GPS, Audio and Sensor.

The GPS data points are then compressed into a series of tracks (vectors and arcs) that represent the route taken by the user. Each of the track records consist of a start and stop position. An observation record's location information is determined using time and the GPS data to interpolate the location and the associated track and position along the track. The record consists of the observations text data and other sensor data, the track it was associated to, and the position along the track the observation was made. These pieces of information are used to correlate to the route taken and the observations made to the underlying network segments, in this example the streets segments that were driven.

In the example shown, the user drives the city streets and makes observations about the condition of the streets. A typical point observation statement is "hole medium". This observation is correlated to the street network, and a record is added to the Asphalt Distress Layer of the GIS. An example of a running observation is the combination "Segment Start", "Surface Asphalt" and "Segment End". These statements make a running observation which would be converted into a series of Asphalt Surface records for each street segment, and partial segment driven over between the "Segment Start" and "Segment End" statements.

Thus, as shown in FIG. 9 the collected GPS data is converted into the Track data. The Track data is correlated with the Street Network data. FIG. 9 also shows Defect data being loaded into its Asphalt Distress Layer. This Defect data from the Asphalt Distress Layer is then combined with the Street Network correlation results to create the association of the Defect with the Asset. The process from the GPS data layer to the Track data layer (illustrated diagrammatically in FIG. 9) is also illustrated by the 1.2 Vectorize Location Data process in FIG. 2. The linkage from the Track layer to the Street Network Layer (illustrated In FIG. 9) is also illustrated by the 2.1 Correlate Tracks to Network process in FIG. 3. The input of the Defect data into the Asphalt Distress Layer (illustrated in FIG. 9) is also illustrated by the 1.6 Interpret Text process of FIG. 2. The linkage between the Asphalt Distress Layer and the Street Network layer (illustrated in FIG. 9) is also illustrated by the 2.3 Correlate Observation To Network process in FIG. 3. FIG. 9 diagrammatically illustrates the example of FIG. 8 with respect to the two events noted on Elm Street as illustrated in FIG. 5.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method of combining captured location data with captured voice data by using a predefined reference grammar with a semantic relationship structure, said method comprising:

constructing the predefined reference grammar for the voice data to be captured;

incorporating the semantic relationship structure in the predefined reference grammar;

capturing free speech stating verbal observations containing the voice data;

time tagging each said captured free speech stating verbal observations to create a raw verbal observation;

capturing the location data contemporaneously with each said captured free speech stating verbal observations;

time tagging the captured location data; and using the predefined reference grammar and the semantic relationship structure to enable the captured voice data in at least two raw verbal observations to be combined automatically with the captured location data into a single record in a geographic information system data base.

2. The invention defined in claim 1 including time tagging all records in the geographic information system data base using only the central processing unit clock of a computer.

3. The invention defined in claim 2 including capturing a third stream of sensor data;

time tagging all said captured third stream of sensor data by said central processing unit clock of said computer; and automatically combining specific items of said third stream of sensor data into specific records having specific voice data and specific location data by using said time tagging as a synchronizing key.

4. The invention defined in claim 1 including using a mobile computer configured with a global positioning satellite receiver to capture the location data.

5. The invention defined in claim 1 including using a mobile computer configured with a sound board for capturing said free speech stating verbal observations containing the voice data.

6. The invention defined in claim 1 including using a mobile computer for capturing both the location data and said free speech stating verbal observations containing the voice data and including transferring the captured location data and the captured voice data from said mobile computer to a processing computer which combines the captured voice data and the captured location data into said single record which is stored in said geographic information system data base associated with said processing computer.

7. The invention defined in claim 1 including configuring the predefined reference grammar and the semantic relationship structure to a specific form for a specific application.

8. The invention defined in claim 7 wherein said specific application is a street maintenance application and the predefined reference grammar and the semantic relationship structure are configured to a specific form for use in said street maintenance application.

9. The invention defined in claim 1 including correlating the captured location data to linear networks.

10. The invention defined in claim 1 including correlating the captured location data to point observations.

11. The invention defined in claim 1 including correlating the location data to each said raw verbal observation and then to certain layers of said geographic information system data base.

12. A spatial asset management system apparatus for combining captured location data with captured voice data by using a reference grammar with a semantic relationship structure, said apparatus comprising:

a reference grammar means for interpreting the captured voice data contained in a verbal observation;

said reference grammar means incorporating a semantic relationship structure means for combining the captured voice data contained in at least two of said verbal observations;

free speech capturing means for capturing said verbal observation containing the voice data;

location data capturing means for capturing the location data contemporaneously with said verbal observation;

time tagging means for time tagging said captured verbal observation to create a raw verbal observation and for also time tagging the captured location data; and data conversion processing means for using said reference grammar means and said semantic relationship structure means to enable the voice data in at least two of said raw verbal observations to be combined automatically with the captured location data into a single record in a geographic information system data base.

13. The invention defined in claim 12 wherein said time tagging means uses only the central processing unit clock of a computer.

14. The invention defined in claim 13 including a sensor data capturing means for capturing a third stream of sensor data, and wherein said time tagging means time tags all captured sensor data, and wherein said data conversion processing means automatically combinines specific items of sensor data into specific records having specific voice data and specific location data by using said time tagging means as a synchronizing key.

15. The invention defined in claim 12 wherein said location data capturing means comprises a mobile computer configured with a global positioning satellite receiver to capture the location data.

16. The invention defined in claim 12 wherein said free speech capturing means comprises a mobile computer configured with a sound board for capturing said free speech stating said verbal observation containing the voice data.

17. The invention defined in claim 12 wherein said free speech capturing means and said location data capturing means comprise a mobile computer for capturing both the location data and said verbal observation containing the voice data and including a transfer means for transferring the captured location data and the captured voice data from said mobile computer to a processing computer which combines the captured voice data and the captured location data into said single record which is stored in said geographic information system data base associated with said processing computer.

18. The invention defined in claim 12 wherein said reference grammar means and said semantic relationship structure means are configured to a specific form for a specific application.

19. The invention defined in claim 17 wherein said specific application is a street maintenance application and said reference grammar means and said semantic relationship structure means are configured to a specific form for use in the specific street maintenance application.

20. The invention defined in claim 12 wherein said free speech capturing means continuously captures all audio input and wherein said data conversion processing means automatically removes all non free speech audio input.

21. The invention defined in claim 12 including a correlation means for automated correlation of the captured location data with the captured voice data.

22. The invention defined in claim 21 wherein said correlation means provides automated correlation of the location data to linear networks.

23. The invention defined in claim 21 wherein said correlation means provides automated correlation of the location data to point observations.

24. The invention defined in claim 21 wherein said correlation means provides automated correlation of the location data to said raw verbal observation and then to certain layers of said geographic information system data base.

25. A method of combining captured location data with captured voice data by using a predefined reference grammar with a semantic relationship structure, said method comprising:

constructing the predefined reference grammar for the voice data to be captured;

incorporating the semantic relationship structure in the predefined reference grammar;

capturing and time tagging a first free speech stating a first verbal observation containing a first voice data to create a first raw verbal observation;

capturing and time tagging a second free speech stating a second verbal observation containing a second voice data to create a second raw verbal observation;

capturing a first location data contemporaneously with said first raw verbal observation and time tagging said captured first location data;

capturing a second location data contemporaneously with said second raw verbal observation and time tagging said captured second location data;

using the predefined reference grammar and the semantic relationship structure, determining if said first raw verbal observation and said second raw verbal observation are related; and when said first raw verbal observation and said second raw verbal observation are related, combining said first raw verbal observation and said second raw verbal observation automatically with said captured first location data and said captured second location data into a single record in a geographic information system data base.

26. The invention defined in claim 25 wherein when said first raw verbal observation and said second raw verbal observation are not related, combining said first raw verbal observation with said captured first location data into a first record in said geographic information system data base, and combining said second raw verbal observation with said captured second location data into a second record in said geographic information system data base.

27. The invention defined in claim 25 including using a mobile computer in communication with a location receiver device for capturing the location data.

28. A spatial asset management system apparatus for combining captured location data with captured voice data by using a reference grammar with a semantic relationship structure, said apparatus comprising:

a reference grammar means for interpreting the voice data captured in a first verbal observation and a second verbal observation;

said reference grammar means incorporating a semantic relationship structure means for analyzing the captured voice data contained in said first and second verbal observations to determine if said first and second verbal observations are related;

free speech capturing means for capturing free speech stating said first and second verbal observations containing the voice data;

location data capturing means for capturing the location data contemporaneously with said first and second verbal observations;

time tagging means for time tagging the voice data captured in said first and second verbal observations to create a first raw verbal observation and a second raw verbal observation and for also time tagging the captured location data for said first and second verbal observations; and data conversion processing means for using said reference grammar means and said semantic relationship structure means to automatically combine said first and second raw verbal observations when they are related with the captured location data for said first and second raw verbal observations into a single record in a geographic information system data base.

29. The invention defined in claim 28 wherein when said first raw verbal observation and said second raw verbal observation are not related, said data conversion processing means combines said first raw verbal observation with said captured first location data into a first record in said geographic information system data base, and combines said second raw verbal observation with said captured second location data into a second record in said geographic information system data base.

30. The invention defined in claim 28 wherein said location data capturing means comprises a mobile computer in communication with a location receiver device for capturing the location data.

* * * * *

UNITED STATES PATENT AND TRADEMARK OFFICE
CERTIFICATE OF CORRECTION

PATENT NO. : 6,272,457 B1
DATED : August 7, 2001
INVENTOR(S) : Ford et al.

It is certified that error appears in the above-identified patent and that said Letters Patent is hereby corrected as shown below:

<u>Title page, item [54] and column 1, line 4,</u>
Title, delete the word "PREDIFED" and replace with the word
-- PREDEFINED --.

Signed and Sealed this

Seventh Day of May, 2002

Attest:

Attesting Officer

JAMES E. ROGAN
Director of the United States Patent and Trademark Office